United States Patent
Lee et al.

(10) Patent No.: US 12,103,451 B2
(45) Date of Patent: Oct. 1, 2024

(54) VIBRATION MOTOR ASSEMBLY OF SEAT

(71) Applicants: Jahwa Electronics Co., Ltd., Cheongju-si (KR); Kia Corporation, Seoul (KR); Hyundai Motor Company, Seoul (KR); Hyundai Transys Inc., Seosan-si (KR)

(72) Inventors: Sang-Hark Lee, Incheon (KR); Sang-Do Park, Suwon-si (KR); Hyun-Seok Song, Yeosu-si (KR); Chan-Ho Jung, Gunpo-si (KR); Hyun-Gyu Sung, Cheongju-si (KR); Jong-Su Ryu, Cheongju-si (KR); Sang-In Woo, Yongin-si (KR); Ho-Suk Jung, Hwaseong-si (KR); Tae-Hyoung Yang, Hwaseong-si (KR); Deok-Soo Lim, Seoul (KR); Sang-Soo Lee, Hwaseong-si (KR); Jung-Sang You, Hwaseong-si (KR); Sang-Gyu Byeon, Cheongju-si (KR); Beom-Sun Kim, Hwaseong-si (KR)

(73) Assignees: Hyundai Motor Company, Seoul (KR); Kia Corporation, Seoul (KR); Hyundai Transys Inc., Seosani-sik (KR); Jahwa Electronics Co., Ltd., Cheongju-si (KR)

( * ) Notice: Subject to any disclaimer, the term of this patent is extended or adjusted under 35 U.S.C. 154(b) by 144 days.

(21) Appl. No.: 18/052,968

(22) Filed: Nov. 7, 2022

(65) Prior Publication Data

US 2023/0211714 A1    Jul. 6, 2023

(30) Foreign Application Priority Data

Dec. 30, 2021 (KR) ........................ 10-2021-0192722

(51) Int. Cl.
*B60N 2/00* (2006.01)
*A61H 23/00* (2006.01)
*B60N 2/90* (2018.01)

(52) U.S. Cl.
CPC .................................... *B60N 2/976* (2018.02)

(58) Field of Classification Search
CPC .............. B60N 2002/981; B60N 2/976; A61H 2201/0149; A61H 2205/081
See application file for complete search history.

(56) References Cited

U.S. PATENT DOCUMENTS

| | | | | |
|---|---|---|---|---|
| 5,437,608 A | * | 8/1995 | Cutler | A61H 23/02 5/915 |
| 6,053,880 A | * | 4/2000 | Sleichter, III | A47C 7/40 5/915 |

(Continued)

FOREIGN PATENT DOCUMENTS

KR    20150071137 A    6/2015

*Primary Examiner* — Shin H Kim
(74) *Attorney, Agent, or Firm* — Slater Matsil, LLP

(57) ABSTRACT

An embodiment vibration motor assembly of a seat includes a vibration motor and an upper housing disposed around the vibration motor to hold and fix the vibration motor, the upper housing configured to be fixed to a pad of the seat, and the upper housing including a holding part disposed at a circumference of a front surface of the upper housing to hold a circumference of the vibration motor and a fixing part protruding from a rear surface of the upper housing to cover and fix a rear surface of the vibration motor.

20 Claims, 22 Drawing Sheets

(56) References Cited

U.S. PATENT DOCUMENTS

| | | | | |
|---|---|---|---|---|
| 6,682,494 | B1* | 1/2004 | Sleichter, III | B60N 2/976 |
| | | | | 297/217.3 |
| 9,004,589 | B2* | 4/2015 | Rockwell | B60N 2/002 |
| | | | | 297/217.3 |
| 9,421,908 | B2* | 8/2016 | McQueen | B06B 1/16 |
| 9,428,124 | B2* | 8/2016 | Bobbitt, III | B60W 50/16 |
| 9,545,879 | B2* | 1/2017 | Stebbins | B60Q 9/008 |
| 10,293,729 | B2* | 5/2019 | Kono | B06B 1/045 |
| 10,549,665 | B2* | 2/2020 | Nakano | A61H 23/0263 |
| 10,940,872 | B2* | 3/2021 | Alexiou | G05B 9/00 |
| 10,994,747 | B2* | 5/2021 | Augst | B60W 60/001 |
| 11,052,924 | B2* | 7/2021 | Van Abbema | B60W 50/16 |
| 11,241,988 | B2* | 2/2022 | Mergl | A61H 23/0263 |
| 2004/0143201 | A1* | 7/2004 | Moriyasu | A61H 23/0263 |
| | | | | 601/57 |
| 2007/0241595 | A1* | 10/2007 | Nathan | B60Q 9/00 |
| | | | | 297/217.3 |
| 2009/0227913 | A1* | 9/2009 | Moriyama | B60N 2/90 |
| | | | | 601/49 |
| 2015/0032037 | A1* | 1/2015 | Nakano | A61H 23/02 |
| | | | | 601/46 |
| 2015/0165969 | A1 | 6/2015 | Cha et al. | |

* cited by examiner

VIBRATION MOTOR ASSEMBLY OF SEAT

CROSS-REFERENCE TO RELATED APPLICATIONS

This application claims the benefit of Korean Patent Application No. 10-2021-0192722, filed on Dec. 30, 2021, which application is hereby incorporated herein by reference.

TECHNICAL FIELD

Exemplary embodiments of the present disclosure relate to a vibration motor assembly of a seat.

BACKGROUND

A vibration motor 131 that generates a vibration is installed in a seat 100 of a vehicle.

A seatback 110 or a seat cushion 120 constituting the seat 100 includes a pad 111 for providing a cushioning feeling and a cover 112 for covering the pad 111, and the vibration motor 131 is installed inside the pad 111.

When power is applied, the vibration motor 131 generates a vibration. The vibration generates a warning signal to an occupant, or provides a massage function to the seat 100.

During traveling, when a driver fails to maintain a lane or when drowsiness of the driver is detected, a haptic signal is generated using the vibration generated from the vibration motor 131 to alert the driver.

Alternatively, since the vibration generated by the vibration motor 131 is allowed to be transmitted to skin of the occupant, a massage is provided to the occupant during boarding, and thus convenience is improved.

Generally, the vibration motor 131 is accommodated in a housing and is fixed inside the housing.

However, there is a problem in that a fastening force between the vibration motor 131 and the housing is not constant. Since the fastening force between the vibration motor 131 and the housing is not constant, the vibration generated by the vibration motor 131 may be transmitted in a damped state. Accordingly, an intended vibration is not transmitted to the occupant.

SUMMARY

Exemplary embodiments of the present disclosure relate to a vibration motor assembly of a seat that is mounted in the seat to generate a vibration. Particular embodiments relate to a vibration motor assembly of a seat that is capable of securing a fastening with a pad of the seat and minimizing damping to transmit a vibration.

An embodiment of the present disclosure is directed to a vibration motor assembly of a seat in which a vibration motor is firmly mounted in the seat of a vehicle to improve a vibration transmission force.

Other features and advantages of embodiments of the present disclosure can be understood by the following description and become apparent with reference to the embodiments of the present disclosure. Also, it is obvious to those skilled in the art to which the present disclosure pertains that the features and advantages of the present disclosure can be realized by the means as claimed and combinations thereof.

In accordance with an embodiment of the present disclosure, there is provided a vibration motor assembly of a seat including a vibration motor and an upper housing configured to hold and fix the vibration motor and fixed to a pad of a seat, wherein the upper housing includes a holding part formed at a circumference of a front surface of the upper housing and configured to hold a circumference of the vibration motor, and a fixing part formed to protrude from a rear surface of the upper housing and configured to cover and fix a rear surface of the vibration motor.

The holding part may be formed to hold corners of the vibration motor.

The upper housing may be inserted and fixed to an inside of the pad.

The upper housing may be fixed to the pad using a tape.

The vibration motor assembly may further include a lower housing inserted into the pad, and the upper housing may be fastened to the lower housing.

A hook may be formed on a rear surface of the upper housing, and the hook may pass through the lower housing to be fastened so that the upper housing and the lower housing may be fastened.

The hook may be formed on a rear surface of the fixing part.

A fixing protrusion passing through the lower housing may be formed on the rear surface of the upper housing, and a hook part hooked and fixed to the lower housing may be formed at the fixing protrusion.

The fixing protrusion may be formed on the rear surface of the fixing part.

The upper housing and the fixing protrusion may be formed to have different hardnesses.

The vibration motor assembly may further include a fastening bolt configured to pass through the upper housing and the lower housing, and a fastening nut screw-coupled to the fastening bolt.

A bracket fitted between the lower housing and the fastening nut may be provided.

The upper housing may be made of materials having different hardnesses along a width direction or a length direction of the upper housing.

A central portion of the upper housing, in which the vibration motor is fixed, and an outer side thereof may be made of materials having different hardnesses.

The vibration motor and the upper housing may be installed in at least one among a seatback configured to support the back of an occupant, a seat cushion configured to support the buttocks of the occupant, a headrest configured to support the head of the occupant, a leg support configured to support the calf of the occupant, and a foot massager configured to massage the foot of the occupant.

The vibration motor assembly may further include a controller configured to control an operation of the vibration motor, and the controller may operate the vibration motor when giving attention and a warning to a driver of the vehicle.

DETAILED DESCRIPTION OF ILLUSTRATIVE EMBODIMENTS

Figure 1:
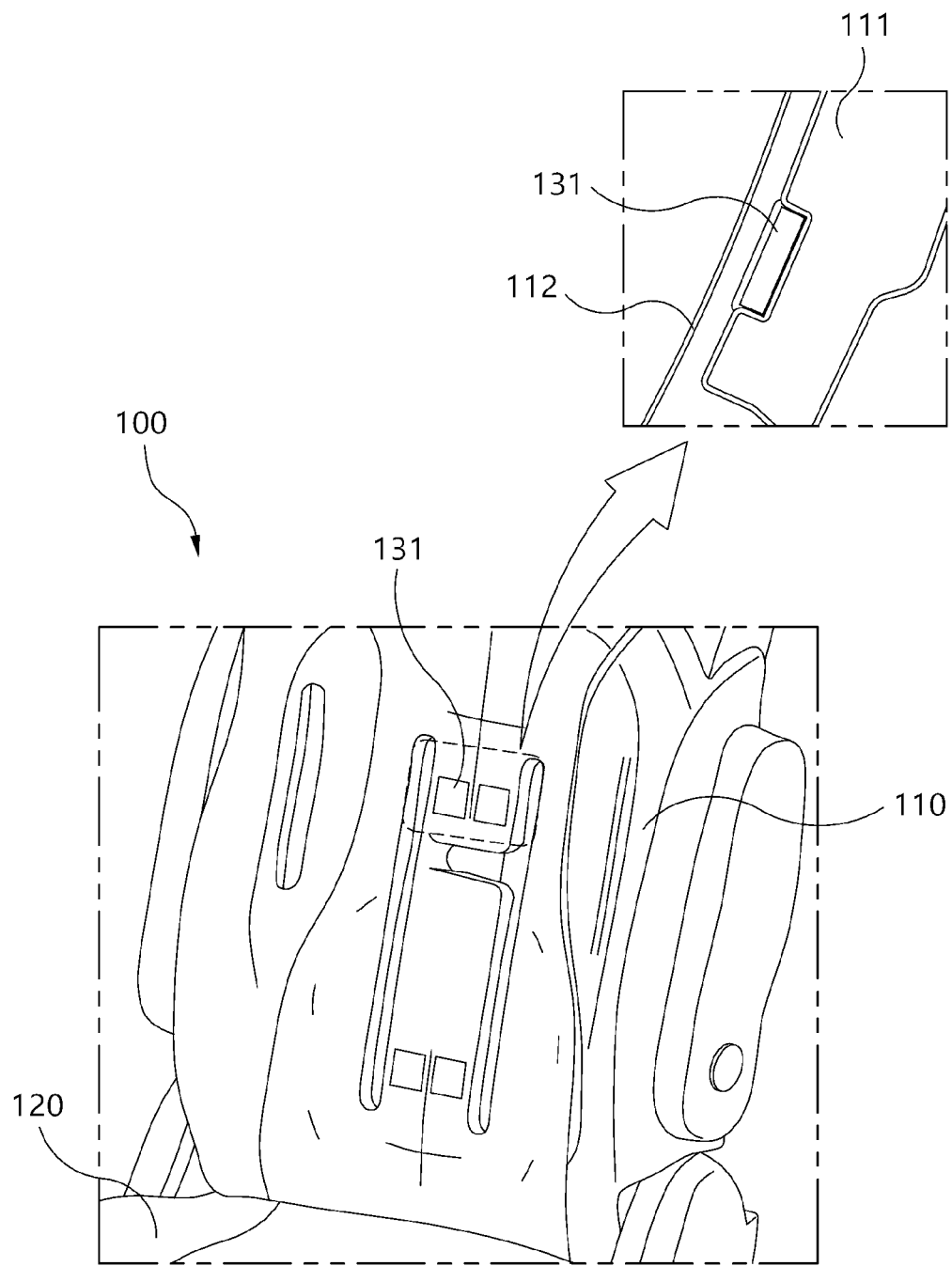
FIG. 1 is a schematic diagram illustrating a state in which a motor is mounted in a seat of a vehicle according to the related art.
Figure 2:
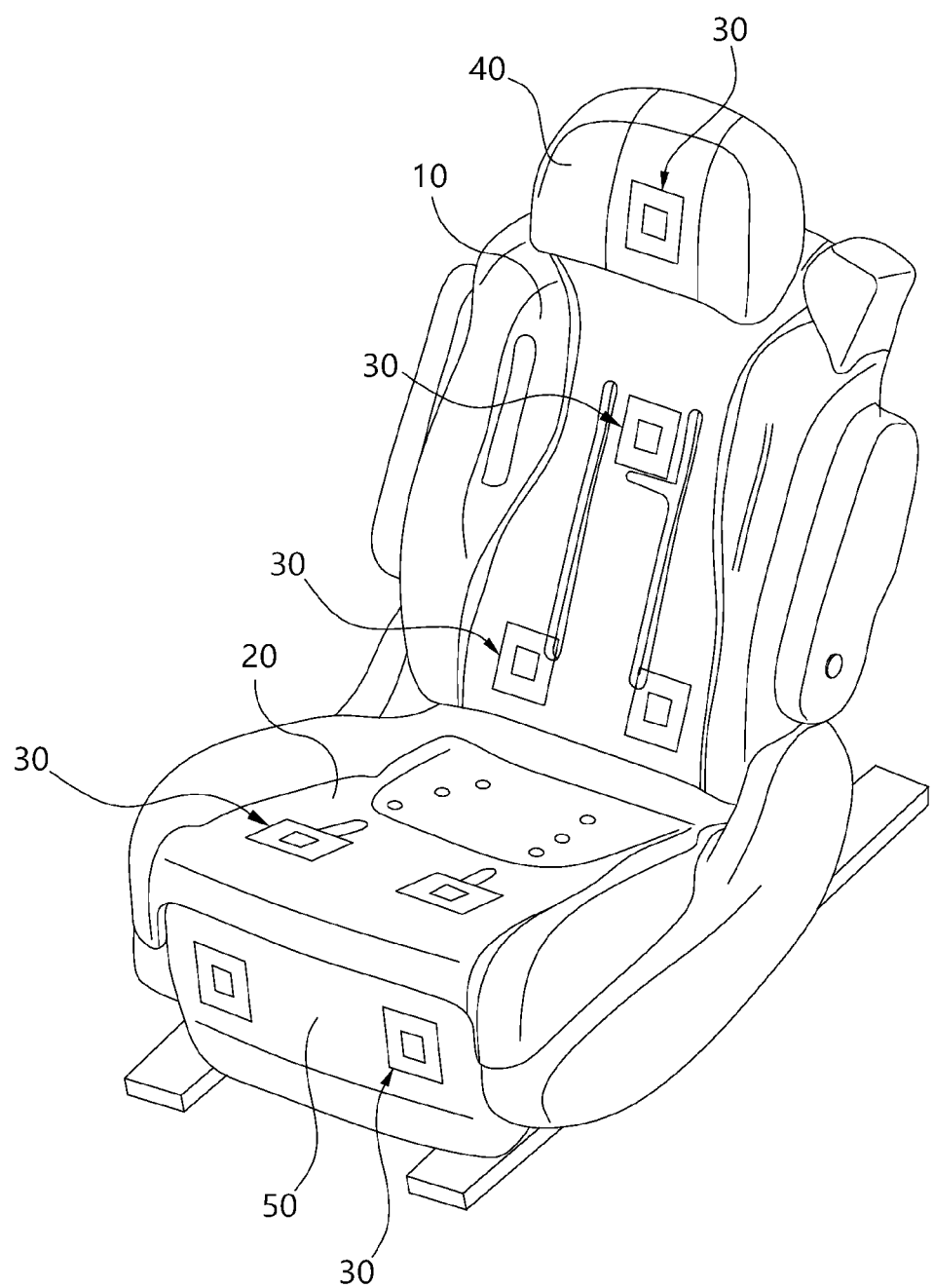
FIG. 2 is a perspective view illustrating a seat to which a vibration motor assembly of a seat is applied according to embodiments of the present disclosure.

Hereinafter, a vibration motor assembly of a seat according to embodiments of the present disclosure will be described in detail with reference to the accompanying drawings.

A vibration motor assembly 30 according to embodiments of the present disclosure includes a vibration motor 31 and an upper housing 32 configured to hold and fix the vibration motor 31 and fixed to a pad 11 of a seat 1. The upper housing 32 has a holding part 32a formed at a circumference of a front surface of the upper housing 32 and configured to hold a circumference of the vibration motor 31, and a fixing part 32b formed to protrude from a rear surface of the upper housing 32 to cover and fix a rear surface of the vibration motor 31.

In the seat 1, the vibration motor assembly 30 is applied to a seatback 10, a seat cushion 20, a leg support 50, a headrest 40, and a foot massager 60 and generates a vibration for a massage function to an occupant. That is, the vibration motor 31 and the upper housing 32 constituting the vibration motor assembly 30 are installed in the seatback 10 configured to support the back of the occupant, the seat cushion 20 configured to support the buttocks of the occupant, the headrest 40 configured to support the head of the occupant, the leg support 50 configured to support the calf of the occupant, and the foot massager 60 configured to massage the feet of the occupant, and the vibration motor assembly 30 generates a vibration for massaging the occupant.

Each of the seatback 10, the seat cushion 20, the leg support 50, the headrest 40, and the foot massager 60 may include the pad 11 providing a cushioning feeling and a cover 12 covering the pad 11, and the vibration motor assembly 30 is mounted in the pad 11.

In embodiments of the present disclosure, a case in which the vibration motor assembly 30 is installed in the seatback 10 will be mainly described.

Figure 12:
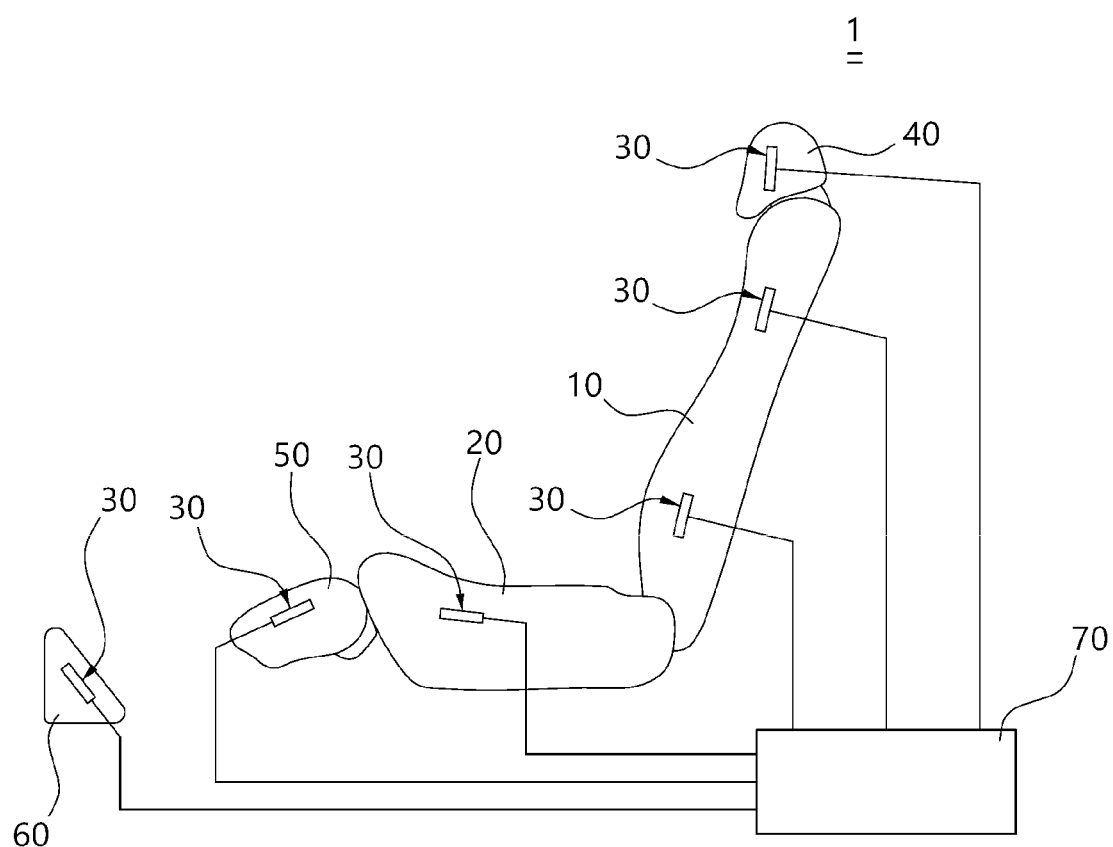
FIG. 12 is a schematic diagram illustrating a state in which the vibration motor assembly of a seat is connected to a controller according to embodiments of the present disclosure.

In addition, the vibration motor assembly 30 is connected to advanced driver assistance systems (ADASs) such as a lane keeping assistance system (LKA), a forward collision avoidance assistance system (FCA), and a blind-spot collision avoidance system (BCA) of a vehicle, and the vibration motor assembly 30 generates an attention signal and a warning signal as vibrations to the occupant in a hazard situation. A controller 70 (see FIG. 12) for controlling the operation of the vibration motor 31 is connected to the advanced driver assistance systems and transmits an attention signal and a warning signal, which are to be transmitted to the occupant (particularly, a driver), as vibrations. In addition to the attention signal and the warning signal generated by the advanced driver assistance systems, even when an attention signal and a warning signal of a general vehicle are transmitted to the driver, the controller 70 controls the operation of the vibration motor 31. The controller 70 may vary a magnitude and a period of a vibration for each of the attention signal and the warning signal or may change a vibrating portion in the seat 1.

When power is applied, the vibration motor 31 generates a vibration due to a rotation of the vibration.

The vibration motor 31 is fixed to the upper housing 32. The upper housing 32 is located adjacent to a surface of the seatback 10 to transmit the vibration generated by the vibration motor 31 to the occupant.

In order for the upper housing 32 to fix the vibration motor 31, the holding part 32a for holding the circumference of the vibration motor 31 is formed at a circumference of a front surface of the upper housing 32.

Figure 3:
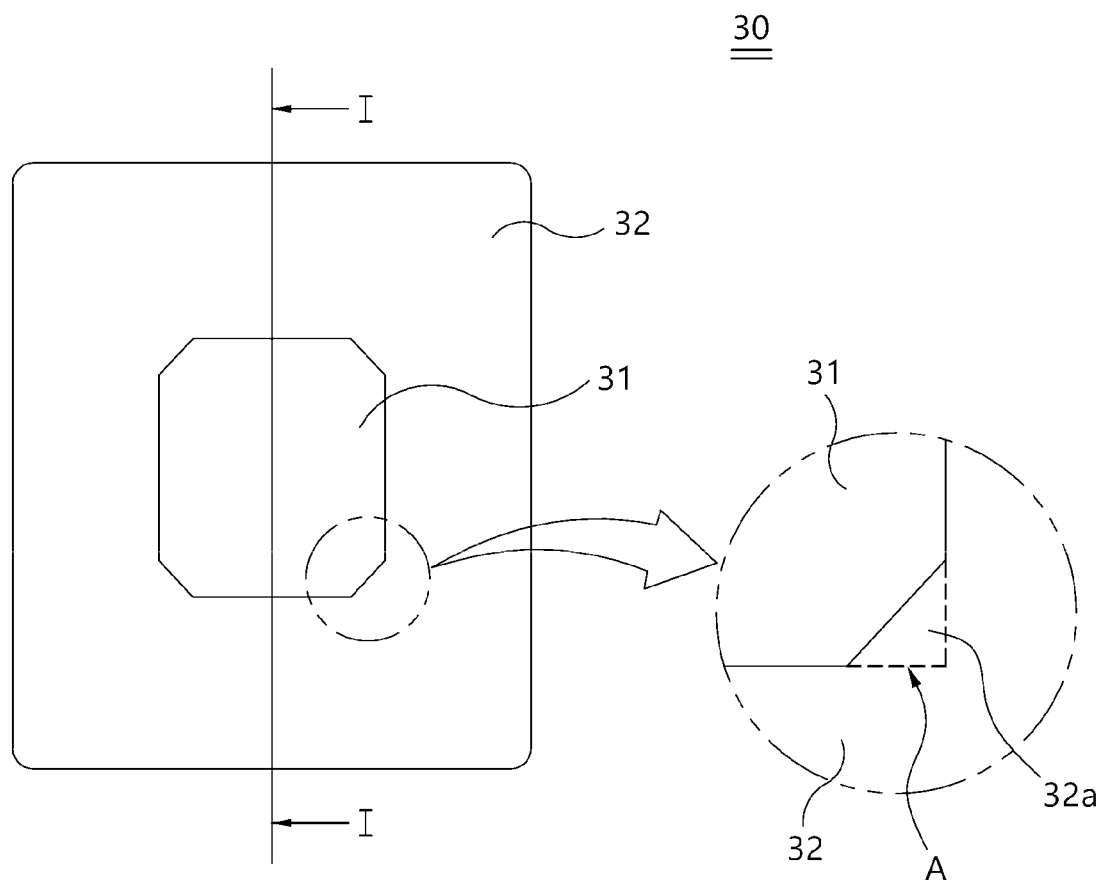
FIG. 3 is a front view illustrating a state in which a vibration motor is fastened to an upper housing in the vibration motor assembly of a seat according to embodiments of the present disclosure.

The upper housing 32 is formed such that most of a front surface of the vibration motor 31 is exposed, and the holding part 32a is formed to hold all or a portion of the circumference of the vibration motor 31. For example, as shown in FIG. 3, the holding part 32a may be formed to hold corners of the vibration motor 31. Due to the holding part 32a, the corners of the vibration motor 31 are prevented from being separated toward a front side of the upper housing 32.

The fixing part 32b protrudes from a rear surface of the upper housing 32. The fixing part 32b protrudes from the rear surface of the upper housing 32 to cover a rear surface of the vibration motor 31, and thus the vibration motor 31 is fixed.

Accordingly, the front surface of the vibration motor 31 is fixed by the holding part 32a, and the rear surface thereof is fixed by the fixing part 32b, so that the vibration motor 31 is coupled to the upper housing 32. The vibration motor 31 is firmly coupled to the upper housing 32 through the holding part 32a and the fixing part 32b, so that a vibration transmission force may be improved.

An assembly of the vibration motor 31 and the upper housing 32 is fixed to an inside of the pad 11.

Figure 4A:
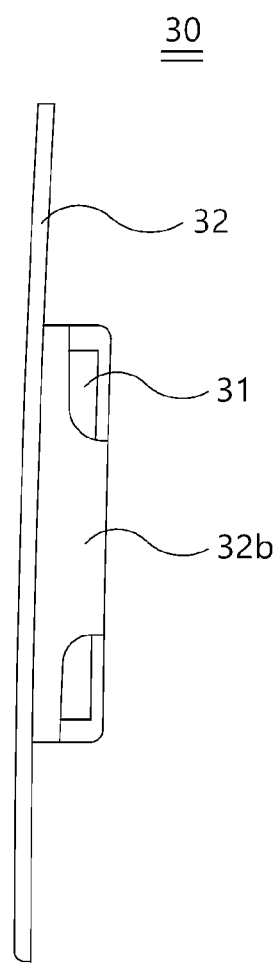
FIGS. 4A to 4C are a side view, a rear view, and a cross-sectional view which respectively illustrate a state of being inserted and fixed to a pad using the upper housing in the vibration motor assembly of a seat according to embodiments of the present disclosure.
Figure 4B:
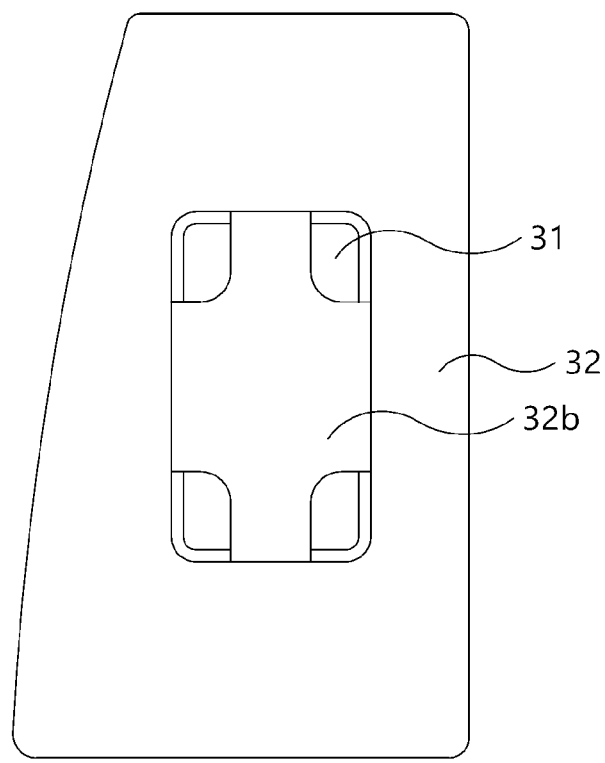
Figure 4C:
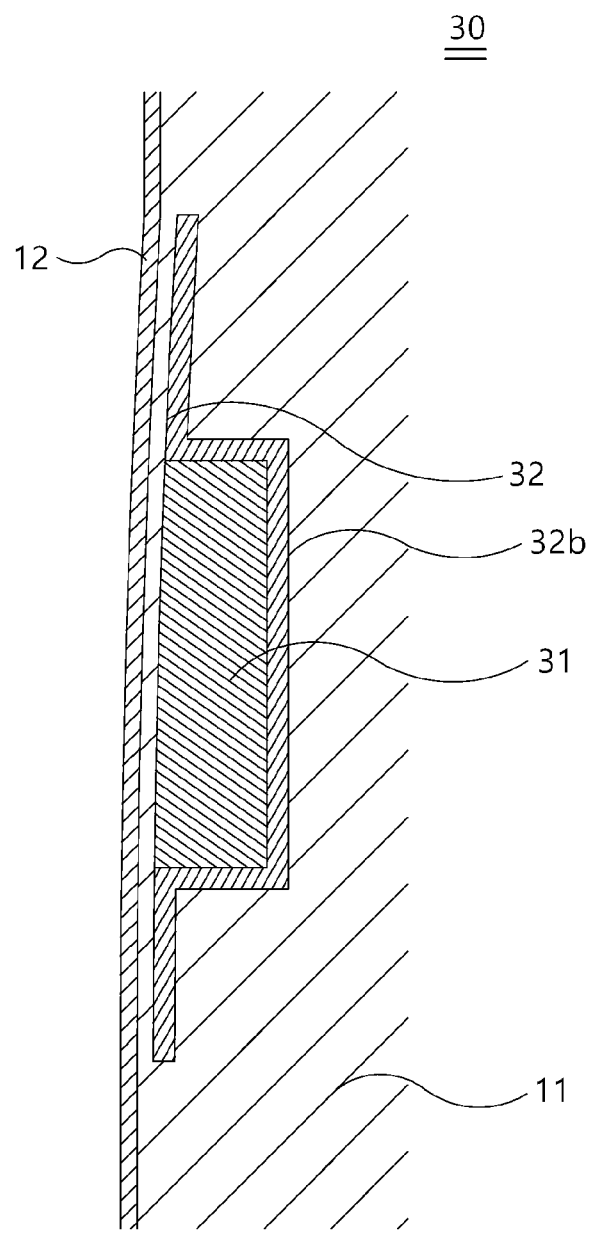

As an example of assembling the assembly of the vibration motor 31 and the upper housing 32 (hereinafter referred to as an "assembly") with the pad 11, the assembly is inserted in advance during an insertion process of the pad 11, and then the pad 11 is inserted so that the assembly is installed inside the pad 11 (see FIGS. 4A to 4C). FIGS. 4A and 4B are a side view and a rear view illustrating the assembly, and FIG. 4C is a cross-sectional view illustrating a state in which the assembly is inserted into the pad 11.

Since the assembly is installed in the pad 11 in an insert manner, the assembly may be installed in the pad 11 without an additional member. Thereafter, since the cover 12 covers an outer side of the pad 11, the seatback 10 may be completed.

Figure 5A:
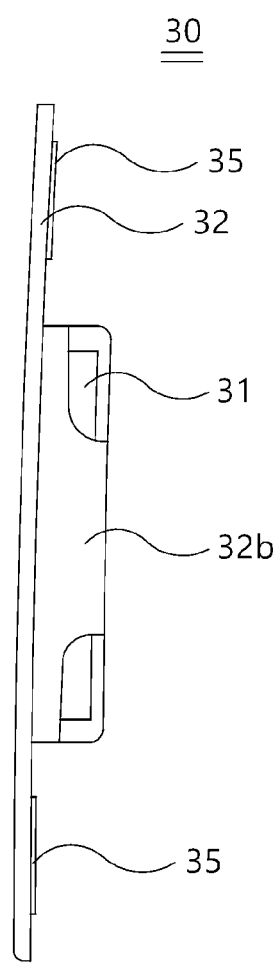
FIGS. 5A to 5C are a side view, a rear view, and a cross-sectional view respectively which illustrate a state of attaching the vibration motor to the pad using a Velcro™ tape in the vibration motor assembly of a seat according to embodiments of the present disclosure.
Figure 5B:
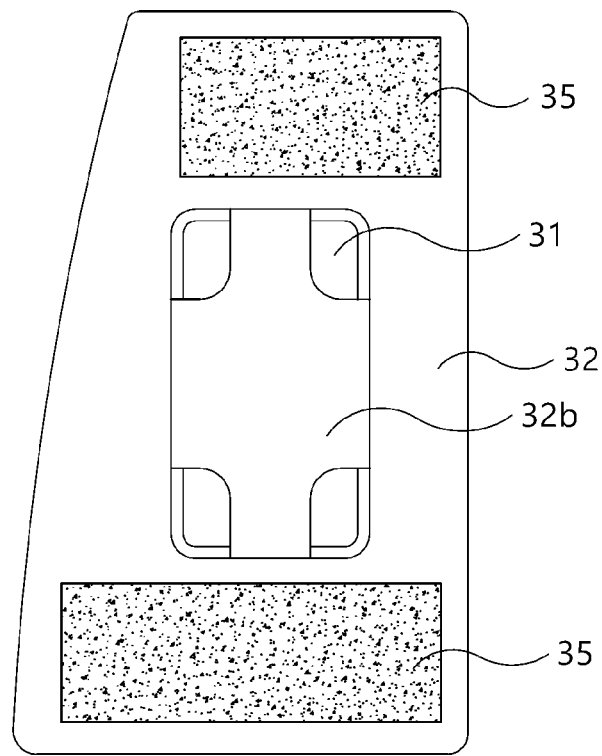
Figure 5C:
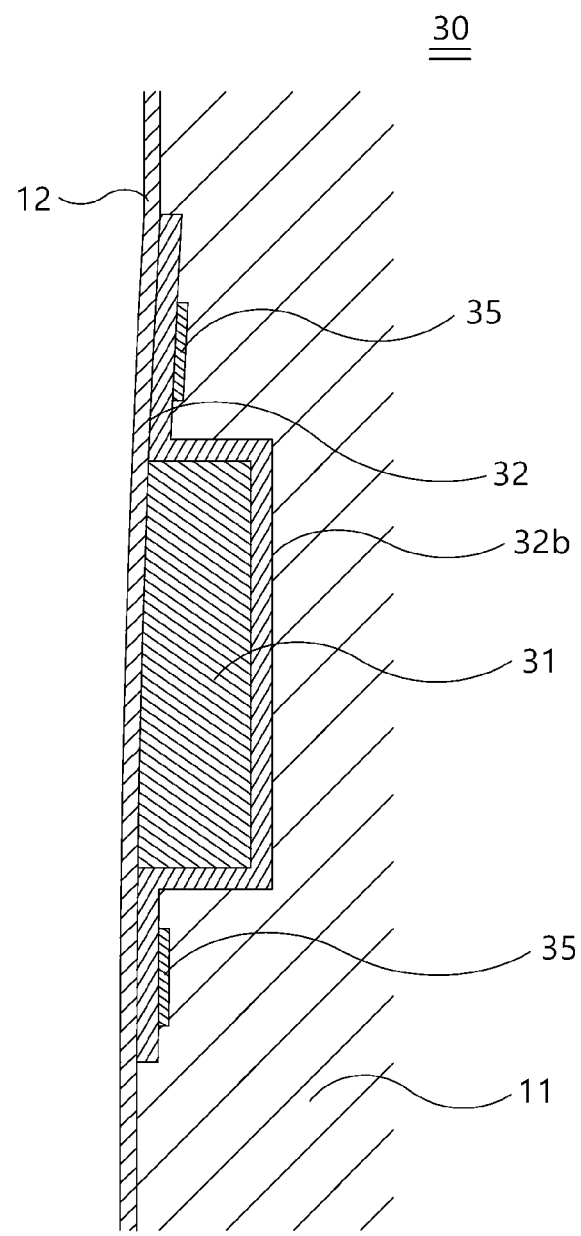

In order to assemble the assembly with the pad 11, a tape 35 may be used (see FIGS. 5A to 5C). FIGS. 5A and 5B are a side view and a rear view illustrating a state in which the tape 35 is attached to the assembly, and FIG. 5C is a cross-sectional view illustrating a state in which the assembly is attached to the pad 11.

The tape 35 is attached to the rear surface of the upper housing 32, and thus the upper housing 32 is attached to the pad 11 using the tape 35. The tape 35, such as a Velcro™ tape or an adhesive tape, is attached to the rear surface of the upper housing 32, and the tape 35 is attached to the pad 11 so that the assembly may be installed in the pad 11.

When the attachment of the assembly is completed, likewise the cover 12 covers the outer side of the pad 11.

Meanwhile, a lower housing 33 coupled to the upper housing 32 is additionally provided, and thus it is possible to strengthen a coupling force between the upper housing 32 and the pad 11.

The lower housing 33 may be inserted inside the pad 11 or may be inserted through the rear surface of the pad 11. During the insertion of the pad 11, the lower housing 33 is inserted in advance, and then the pad 11 is molded so that the lower housing 33 may be molded in a state of being inserted inside the pad 11. Alternatively, after a space capable of accommodating the lower housing 33 is formed in the rear surface of the pad 11 and the lower housing 33 is inserted into the space, the upper housing 32 is located on a front side of the pad 11, and then the upper housing 32 and the lower housing 33 may be coupled.

Figure 6A:
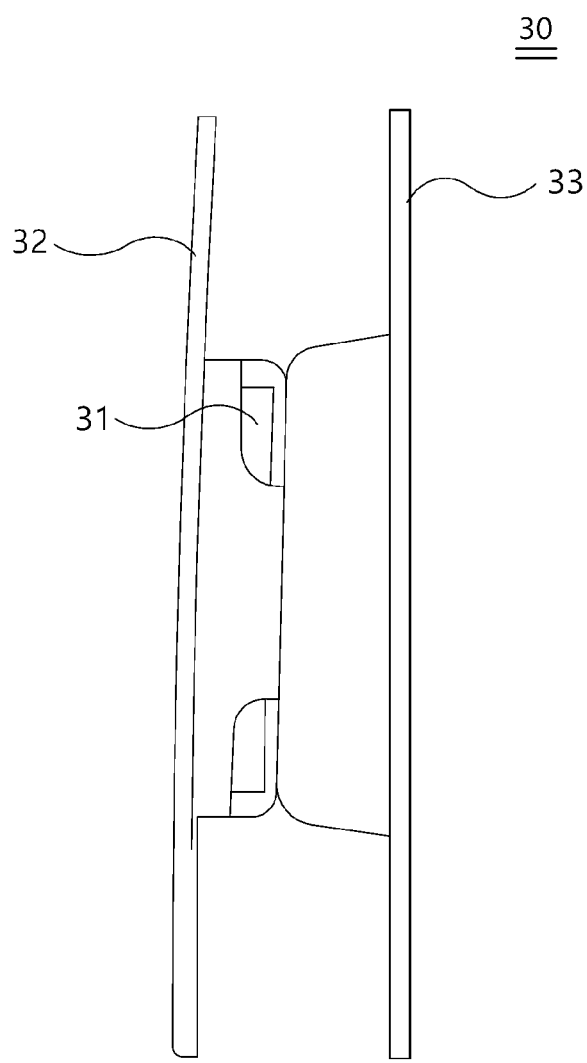
FIGS. 6A to 6C is a side view, a rear view, and a cross-sectional view respectively which illustrate a state of fastening the upper housing and a lower housing using a hook in the vibration motor assembly of a seat according to embodiments of the present disclosure.
Figure 6B:
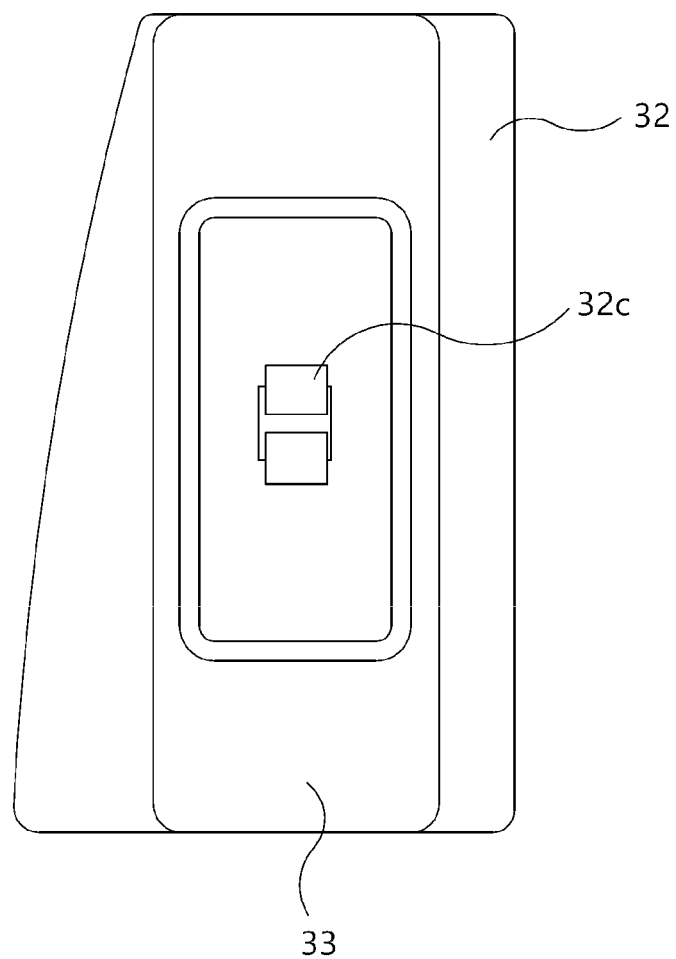
Figure 6C:
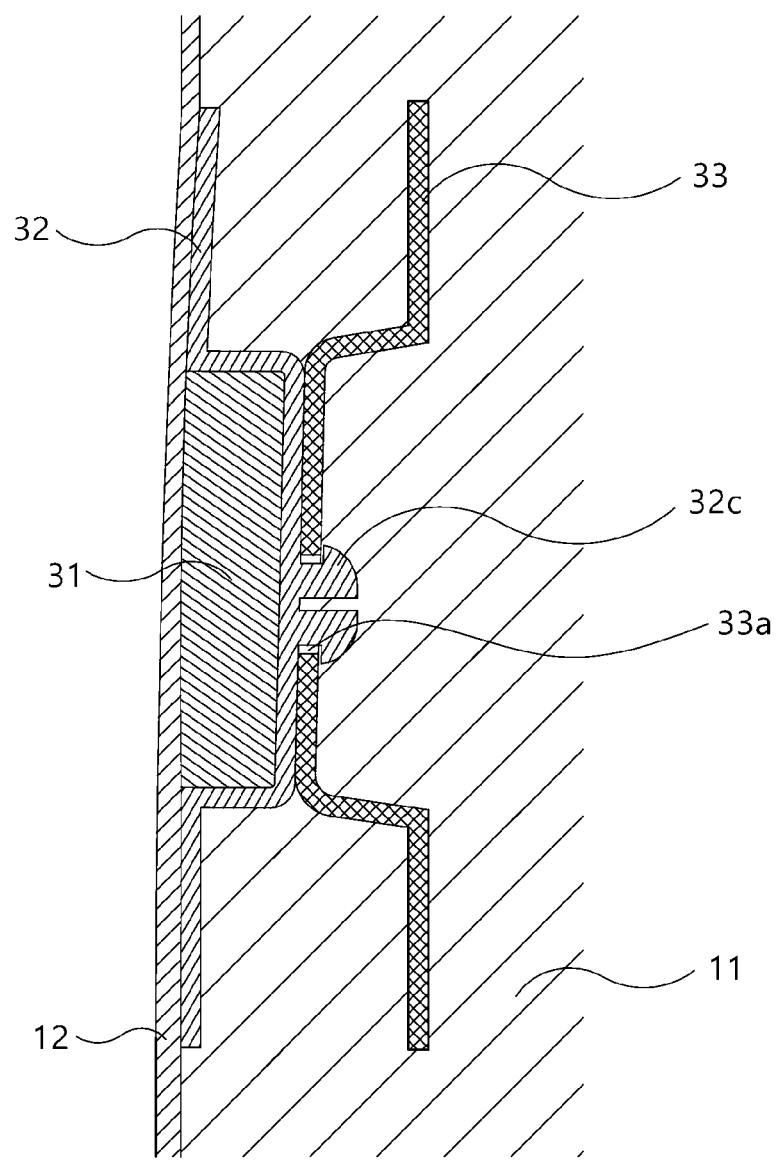

As shown in FIGS. 6A to 6C, a hook 32*c* is formed on the rear surface of the upper housing 32, in particular, the rear surface of the fixing part 32*b*, and the hook 32*c* passes through a through-hole 33*a* formed in the lower housing 33 to be hooked so that the upper housing 32 and the lower housing 33 may be coupled. FIGS. 6A and 6B are a side view and a rear view illustrating a state in which the assembly is coupled to the lower housing 33, and FIG. 6C is a cross-sectional view illustrating the state.

The upper housing 32 to which the vibration motor 31 is fixed is coupled to the lower housing 33 using the hook 32*c* so that the upper housing 32 may be easily coupled to the lower housing 33. The hook 32*c* may be formed as a plurality of hooks 32*c*.

Figure 7A:
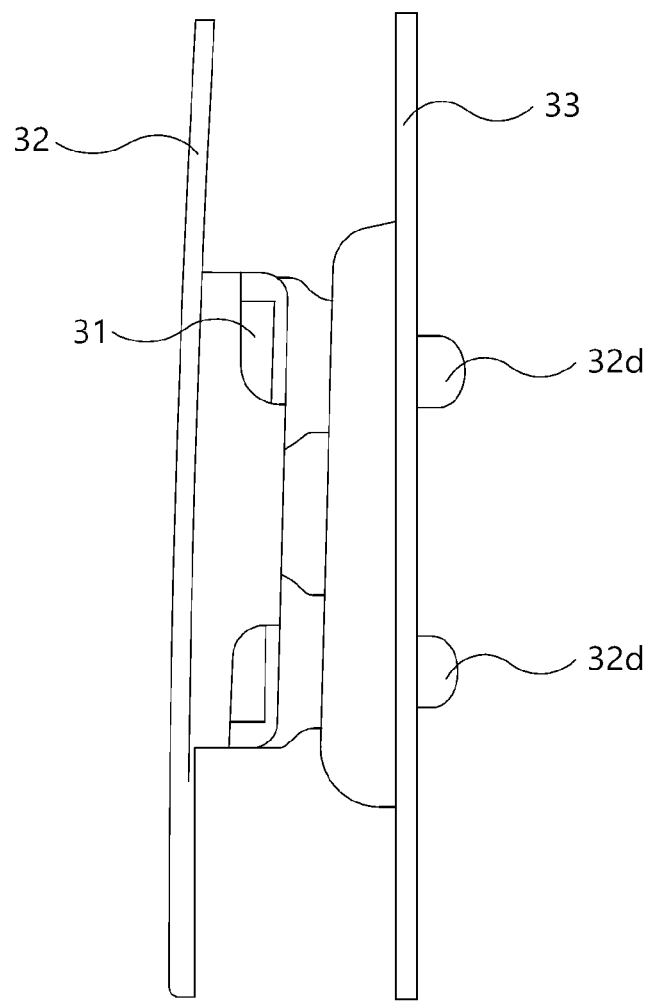
FIGS. 7A to 7C are a side view, a rear view, and a cross-sectional view respectively which illustrate a state of fastening the upper housing and the lower housing using another hook in the vibration motor assembly of a seat according to embodiments of the present disclosure.
Figure 7B:
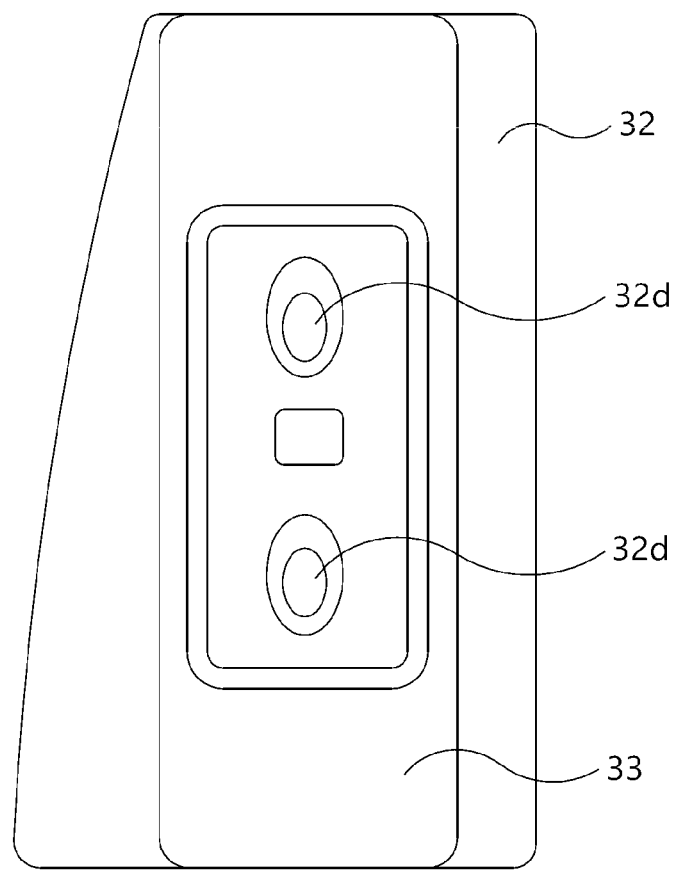
Figure 7C:
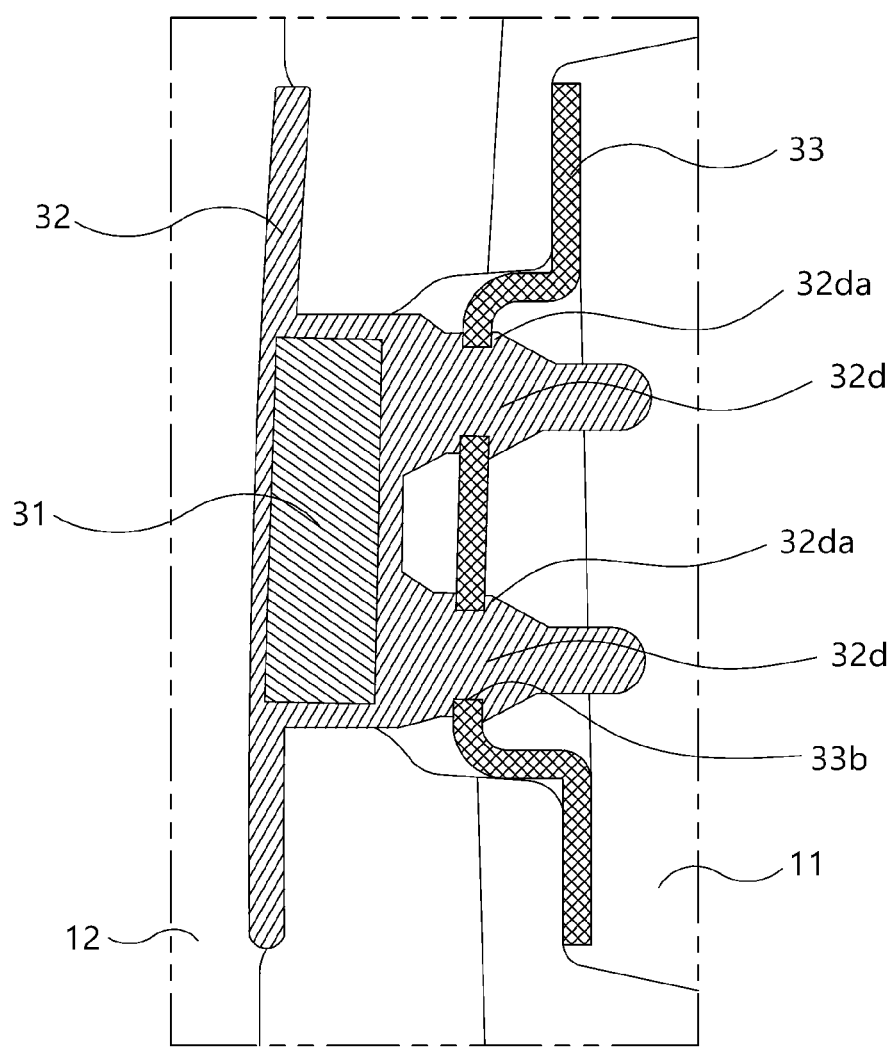

Alternatively, when the upper housing 32 to which the vibration motor 31 is fixed is coupled to the lower housing 33, a hook structure may be used, and in order to further improve a coupling force between the upper housing 32 and the lower housing 33, a structure shown in FIGS. 7A to 7C may be applied. FIGS. 7A and 7B are a side view and a rear view illustrating a state in which the assembly is coupled to the lower housing 33, and FIG. 7C is a cross-sectional view illustrating the state. A fixing protrusion 32*d* is formed to protrude from the rear surface of the upper housing 32, particularly, the rear surface of the fixing part 32*b*. A hook part 32*da* is formed in the middle of the fixing protrusion 32*d*, and the hook part 32*da* is hooked to the through-hole 33*b* formed in the lower housing 33 so that the upper housing 32 and the lower housing 33 may be coupled. The fixing protrusion 32*d* may be formed as a plurality of fixing protrusions 32*d*, and the hook part 32*da* is formed at each of the plurality of fixing protrusions 32*d*.

Figure 8A:
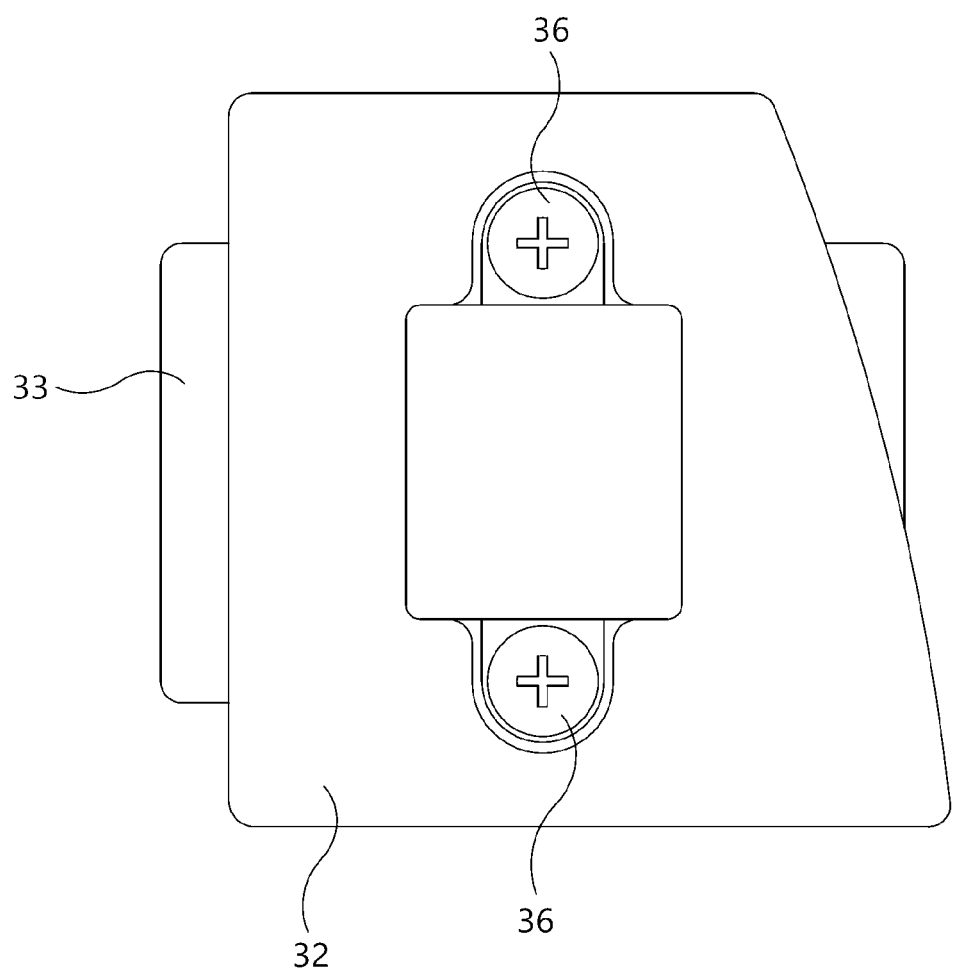
FIGS. 8A to 8C are a front view, a side view, and a rear view respectively which illustrate a state of fastening the upper housing and the lower housing using a fastening bolt in the vibration motor assembly of a seat according to embodiments of the present disclosure.
Figure 8B:
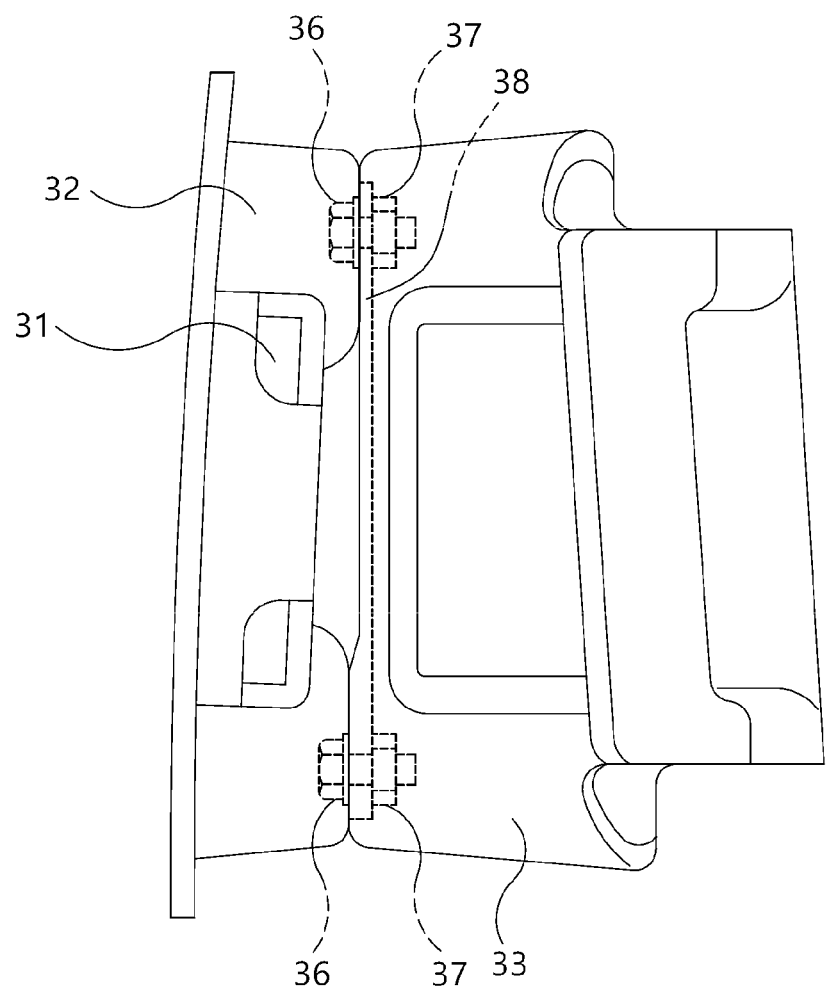
Figure 8C:
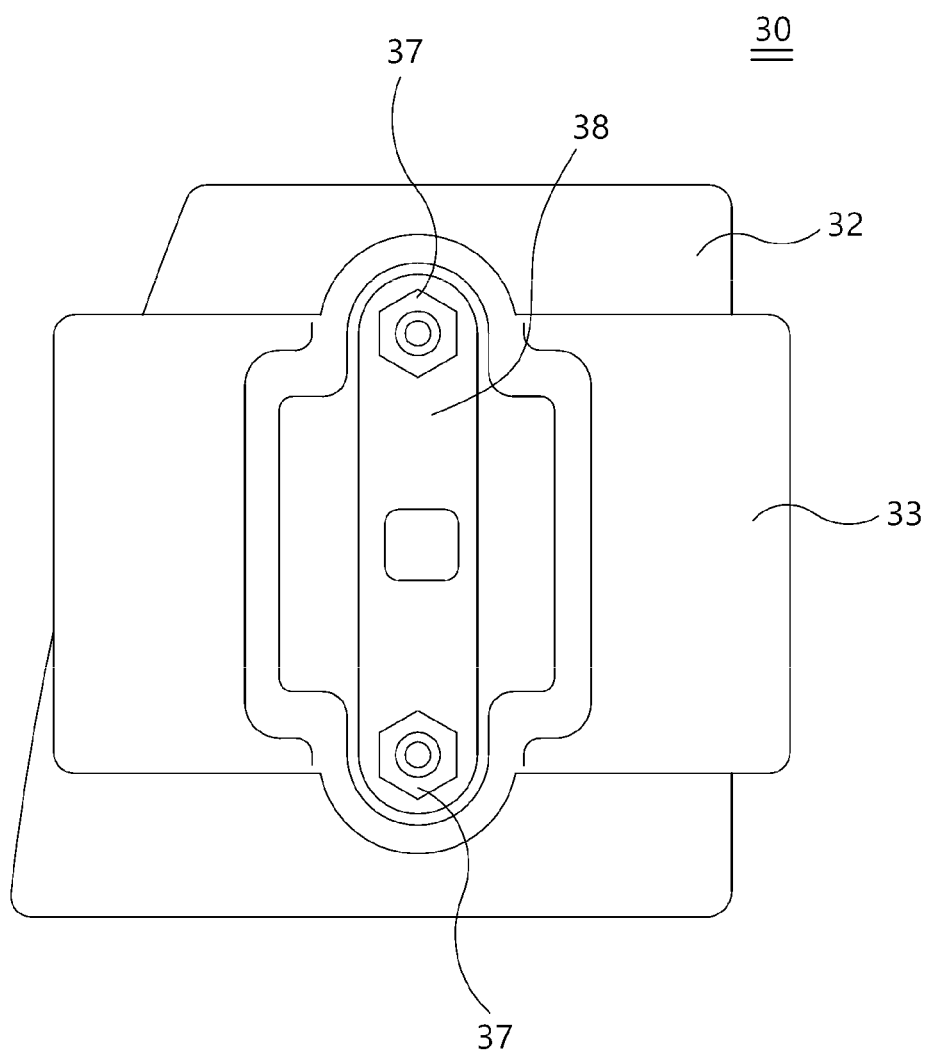

In addition, when the upper housing 32 to which the vibration motor 31 is fixed is coupled to the lower housing 33, a fastening bolt 36 and a fastening nut 37 may be applied (see FIGS. 8A to 8C). FIGS. 8A and 8B are a front view and a side view illustrating a state in which the assembly is coupled to the lower housing 33, and FIG. 8C is a rear view illustrating the state.

Since the fastening bolt 36 sequentially passes through the upper housing 32 and the lower housing 33, and the fastening nut 37 is inserted from the lower housing 33 and thus is fastened to the fastening bolt 36, the upper housing 32 and the lower housing 33 may be fastened. Since the upper housing 32 and the lower housing 33 are coupled using the fastening bolt 36 and the fastening nut 37, the upper housing 32 and the lower housing 33 may be firmly coupled.

In this case, since a bracket 38 is interposed between the lower housing 33 and the fastening nut 37, a fastening force between the fastening bolt 36 and the fastening nut 37 is improved and the fastening force is uniform.

Alternatively, in order to differently transmit the vibration generated by the vibration motor 31 according to a specific direction, a material of the upper housing 32 may be formed non-uniformly.

Figure 9:
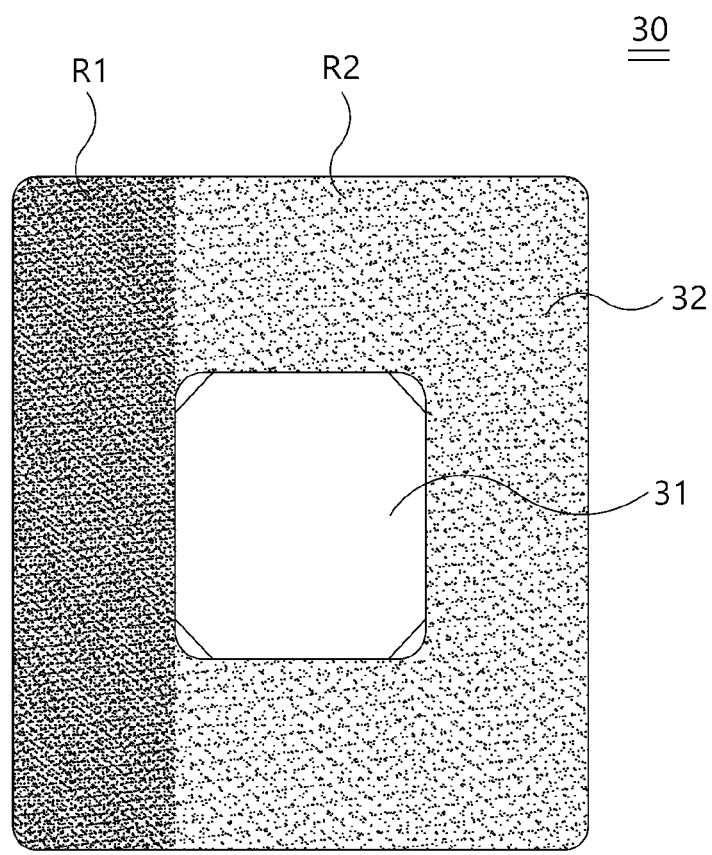
FIG. 9 is a front view illustrating a state in which the upper housing is made of different materials in a width direction in the vibration motor assembly of a seat according to embodiments of the present disclosure.

For example, in order for the vibration in the upper housing 32 to be felt differently in a width direction or in a height direction, the material of the upper housing 32 may be formed differently in the width direction or the height direction of the upper housing 32. That is, as shown in FIG. 9, hardnesses of a region indicated by R1 and hardnesses of a region indicated by R2 are different in the upper housing 32, thus the vibration is felt differently along the width direction of the upper housing 32. Alternatively, the hardnesses of the materials along the height direction and a diagonal direction of the upper housing 32 are different, and the vibration may be felt differently.

Figure 10:
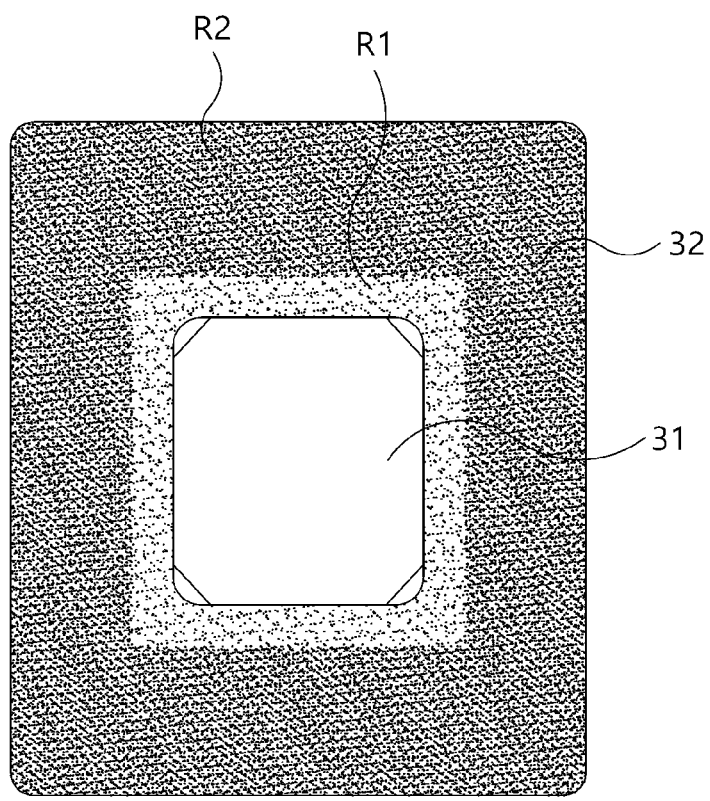
FIG. 10 is a front view illustrating a state in which a central portion and an outer side of the upper housing are made of different materials in the vibration motor assembly of a seat according to embodiments of the present disclosure.

Alternatively, a material of a central portion of the upper housing 32 and a material of the outer side of the upper housing 32 may have different hardnesses, and thus different vibrations may be felt at the central portion and the outer side of the upper housing 32. FIG. 10 illustrates an example in which the upper housing 32 is made of materials having different hardnesses in the central portion indicated by R1 and the outer portion indicated by R2.

Figure 11:
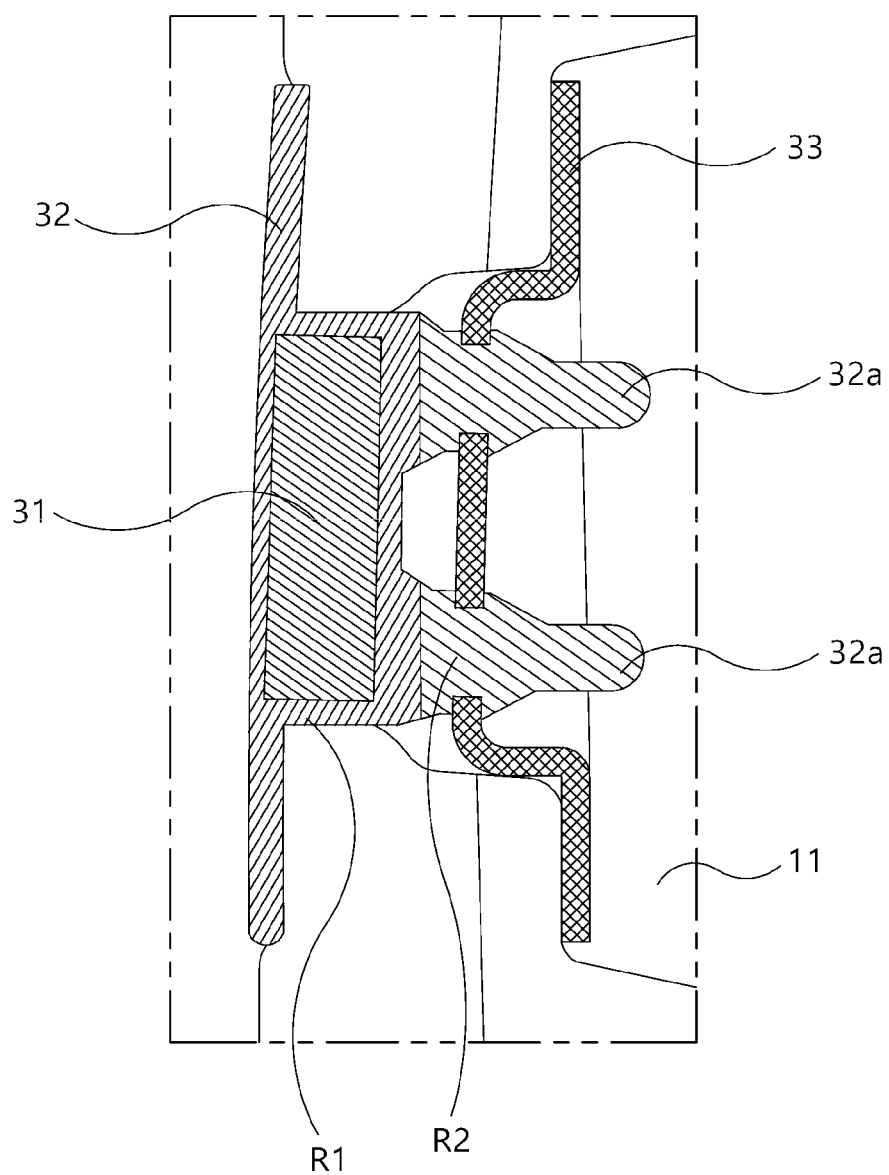
FIG. 11 is a cross-sectional view illustrating a state in which the upper housing is made of different materials in a front-rear direction in the vibration motor assembly of a seat according to embodiments of the present disclosure.

In addition, in order to transmit different vibrations in the front-rear direction of the upper housing 32, the upper housing 32 and the fixing protrusion 32*d* may be made of materials having different hardnesses (see FIG. 11).

In this way, since the materials of the upper housing 32 are formed non-uniformly, the vibration generated by the vibration motor 31 is modulated differently according to the portion part and transmitted to the occupant.

In accordance with a vibration motor assembly of a seat according to embodiments of the present disclosure, which has the above-described configuration, a vibration motor can be firmly coupled to a seat so that a vibration generated from the vibration motor can be transmitted to an occupant without loss.

In particular, an upper housing to which the vibration motor is fixed and a lower housing coupled to the upper housing firmly couple the vibration motor so that the upper housing and the lower housing can be used as a vibration transmission body.

Since a vibration transmission force is improved, the overall vibration performance can be improved even when the same vibration motor is used.

In addition, the vibration generated by the vibration motor can be tuned as a vibration transmitted to the occupant by varying hardness of the upper housing, and thus it is possible to diversify a warning signal and subdivide a massage.

While the present disclosure has been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

What is claimed is:

1. A vibration motor assembly of a seat, the vibration motor assembly comprising:
 a vibration motor; and
 an upper housing disposed around the vibration motor to hold and fix the vibration motor, the upper housing configured to be fixed to a pad of the seat, wherein the upper housing comprises:
 a holding part disposed at a circumference of a front surface of the upper housing to hold a circumference of the vibration motor; and
 a fixing part protruding from a rear surface of the upper housing to cover and fix a rear surface of the vibration motor.

2. The vibration motor assembly of claim 1, wherein the holding part holds corners of the vibration motor.

3. The vibration motor assembly of claim 1, wherein the upper housing is configured to be inserted in the seat and fixed to an inside of the pad.

4. The vibration motor assembly of claim 1, wherein the upper housing is configured to be fixed to the pad using a tape.

5. The vibration motor assembly of claim 1, wherein the upper housing comprises materials having different hardnesses along a width direction or a length direction of the upper housing.

6. The vibration motor assembly of claim 1, wherein a central portion of the upper housing in which the vibration motor is fixed comprises a first material and an outer side of the upper housing comprises a second material, and wherein the first material and the second material have different hardnesses.

7. The vibration motor assembly of claim 1, wherein the vibration motor and the upper housing are disposed in a seatback configured to support a back of an occupant, a seat cushion configured to support a buttocks of the occupant, a headrest configured to support a head of the occupant, a leg support configured to support a calf of the occupant, or a foot massager configured to massage a foot of the occupant.

8. The vibration motor assembly of claim 1, further comprising a controller configured to control an operation of the vibration motor to provide an attention signal or a warning signal to an occupant of the seat.

9. A vibration motor assembly of a seat, the vibration motor assembly comprising:
 a vibration motor;
 an upper housing disposed around the vibration motor to hold and fix the vibration motor, the upper housing configured to be fixed to a pad of the seat, wherein the upper housing comprises:
 a holding part disposed at a circumference of a front surface of the upper housing to hold a circumference of the vibration motor; and
 a fixing part protruding from a rear surface of the upper housing to cover and fix a rear surface of the vibration motor; and
 a lower housing fastened to the upper housing and configured to be inserted into the pad.

10. The vibration motor assembly of claim 9, further comprising a hook disposed on a rear surface of the upper housing, wherein the hook passes through the lower housing to be fastened so that the upper housing and the lower housing are fastened.

11. The vibration motor assembly of claim 10, wherein the hook is disposed on a rear surface of the fixing part.

12. The vibration motor assembly of claim 9, further comprising:
 a fixing protrusion disposed on the rear surface of the upper housing and passing through the lower housing; and
 a hook part disposed at the fixing protrusion and hooked and fixed to the lower housing.

13. The vibration motor assembly of claim 12, wherein the fixing protrusion is disposed on a rear surface of the fixing part.

14. The vibration motor assembly of claim 12, wherein the upper housing and the fixing protrusion have different hardnesses.

15. The vibration motor assembly of claim 9, further comprising:
 a fastening bolt passing through the upper housing and the lower housing; and
 a fastening nut screw-coupled to the fastening bolt.

16. The vibration motor assembly of claim 15, further comprising a bracket fitted between the lower housing and the fastening nut.

17. A vehicle comprising:
 a vehicle body;
 a seat disposed in the vehicle body, the seat comprising a pad;
 a vibration motor assembly attached to the seat, the vibration motor assembly comprising a vibration motor, a lower housing inserted into the pad, and an upper housing coupled to the lower housing and disposed around the vibration motor to hold and fix the vibration motor, wherein the upper housing is fixed to the pad and comprises:
 a holding part disposed at a circumference of a front surface of the upper housing to hold a circumference of the vibration motor; and
 a fixing part protruding from a rear surface of the upper housing to cover and fix a rear surface of the vibration motor; and
 a controller configured to control an operation of the vibration motor to provide a vibration to an occupant of the seat.

18. The vehicle of claim 17, wherein the upper housing is fixed to the pad using a tape.

19. The vehicle of claim 17, wherein the upper housing comprises materials having different hardnesses along a width direction or a length direction of the upper housing.

20. The vehicle of claim 17, wherein a central portion of the upper housing in which the vibration motor is fixed comprises a first material and an outer side of the upper housing comprises a second material, and wherein the first material and the second material have different hardnesses.

* * * * *

UNITED STATES PATENT AND TRADEMARK OFFICE
CERTIFICATE OF CORRECTION

| | |
|---|---|
| PATENT NO. | : 12,103,451 B2 |
| APPLICATION NO. | : 18/052968 |
| DATED | : October 1, 2024 |
| INVENTOR(S) | : Lee et al. |

It is certified that error appears in the above-identified patent and that said Letters Patent is hereby corrected as shown below:

On the Title Page

Item (72), in Column 1, in "Inventors", Line 9, delete "Hwaseong-si" and insert -- Seoul --.

Item (72), in Column 1, in "Inventors", Line 10, delete "Seoul" and insert -- Hwaseong-si --.

Signed and Sealed this
Twelfth Day of November, 2024

Katherine Kelly Vidal
*Director of the United States Patent and Trademark Office*